March 9, 1965     C. W. ROSE     3,172,702
SAFETY HEAD REST

Filed Jan. 24, 1963     2 Sheets-Sheet 1

INVENTOR.
Clarence W. Rose
BY WHITEHEAD, VOGL & LOWE
PER Frank C. Lowe
ATTORNEYS March 9, 1965
C. W. ROSE
3,172,702
SAFETY HEAD REST
Filed Jan. 24, 1963
2 Sheets-Sheet 2
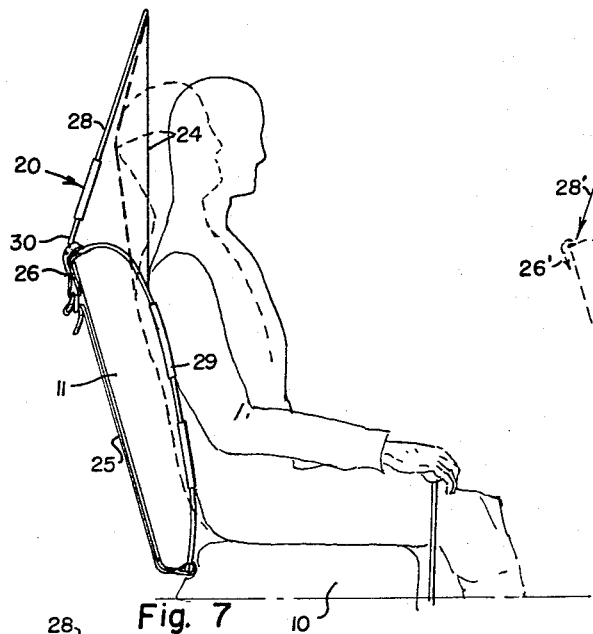
Fig. 7
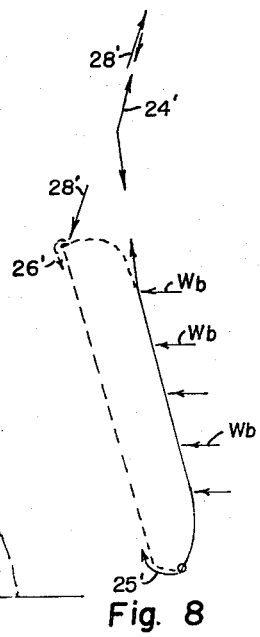
Fig. 8
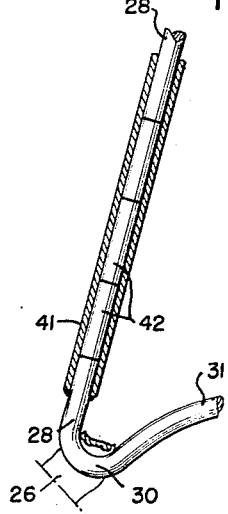
Fig. 4
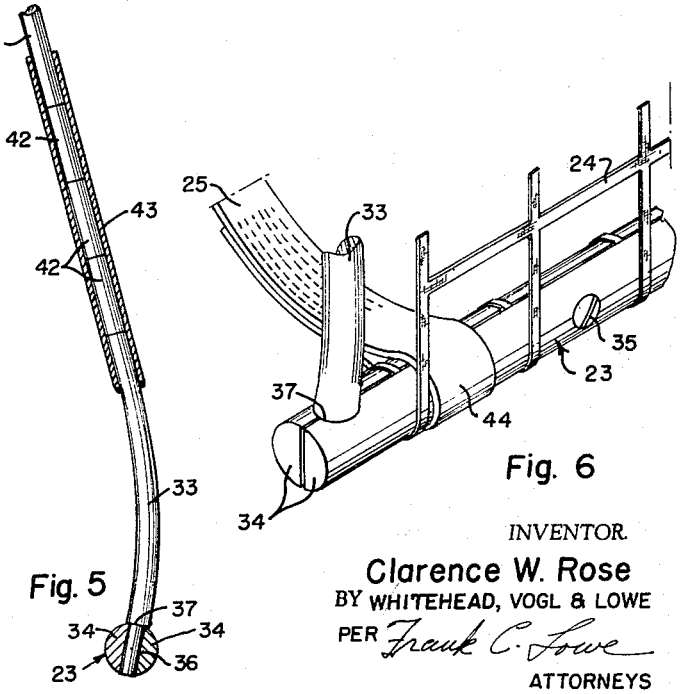
Fig. 5
Fig. 6
INVENTOR.
Clarence W. Rose
BY WHITEHEAD, VOGL & LOWE
PER *Frank C. Lowe*
ATTORNEYS ён
United States Patent Office 3,172,702
Patented Mar. 9, 1965

3,172,702
SAFETY HEAD REST
Clarence W. Rose, Denver, Colo., assignor to Rose
Manufacturing Company, Denver, Colo., a corporation of Colorado
Filed Jan. 24, 1963, Ser. No. 253,706
11 Claims. (Cl. 297—397)

This invention relates to safety equipment for automobiles and more particularly to a safety apparatus, for use in automobiles and like vehicles, which is adapted to hold an occupants head and to prevent a whip-lash injury resulting from a rear end collision to the vehicle. As such, the invention will be hereinafter called a "safety head rest."

Perhaps the most frequent type of automobile accident is the rear end collision where a slowly moving or stopped automobile is struck in the rear by an oncoming vehicle which is unable to reduce its speed, either because of an error in driving judgment, an unexpectedly slippery road, or defective brakes. The impact of such a collision invariably thrusts or bounces the struck automobile forwardly with sudden acceleration and with a lurch to the passenger which can be quite intense even when the speed of the oncoming vehicle, at the instant of impact, is not great.

The driver and passengers in an automobile so struck are ordinarily sitting in an upright position and reclining against the automobile seat backs, relaxed and completely unprepared for the rear end collision. While their bodies, supported by and reclining against the automobile seats are lurched forwardly by the sudden movement of the automobile, their heads, not being supported, are relatively snapped rearwardly, for the ordinary seat back of an automobile is designed to reach only to the shoulders of the occupants. It follows that the forward lurch to the bodies of the occupants of the automobile, accompanied by the snapping-back of their heads, may result in a severe neck injury, commonly called a whip-lash injury.

In the past, many rear end collisions have occurred, especially at intersections where automobiles had to stop. However, in most instances the approach speed of the oncoming vehicle was so slow that no significant damage occurred to the struck automobile, nor serious injury to the occupants thereof, the standard bumpers of the vehicles absorbing the shock of impact. However, with the advent of high-speed, heavy traffic on the many freeways throughout the country, the number of more severe rear-end collisions and of serious whip-lash injuries has increased to startling proportions. This has brought about a real and definite need to protect the driver and his passengers from an accident of this sort.

The present invention was conceived and developed with such need in view. The invention comprises, in essence, a protective sheet or netting which is mounted above the back of an automobile seat directly behind the normal seating position of an occupant of the automobile. This sheet, or preferably netting, is thus adapted to catch and restrain the occupant's head against a relative rearward movement whenever the automobile and the body of the occupant is lurched or accelerated forwardly as in the event of a rear end collision.

It follows that a primary object of the invention is to provide a novel and improved safety head rest for an automobile seat which is particularly effective to restrain any backward snapping movement of an occupant's head, and thereby prevent a whip-lash neck injury.

Another object of the invention is to provide a novel and improved safety head rest for an automobile seat which does not significantly interfere with the rear vision of the occupant nor with his normal movements while in the seat, nor in preferred construction with the normal air movements and ventilating air currents within the passenger compartment of the automobile.

Another object of the invention is to provide a novel and improved safety head rest for an automobile seat which may be permanently fitted to and mounted upon any standard type automobile seat without any structural changes or alterations to the seat, and once fitted in place requires no further adjustments as for different sized individuals.

Another object of the invention is to provide a novel and improved safety head rest for an automobile which upstands from the back of an automobile seat and extends upwardly into the available space above the seat back to terminate near but without touching the top of the automobile and is thereby tall enough for the tallest individual, but will also accommodate a small individual, and is also of ample proportions to properly catch the head of an occupant of the seat regardless of the seating position of the occupant.

Another object of the invention is to provide an improved safety head rest for an automobile which is a light-weight, strong, unit of minimum bulk and having its structural components arranged to take advantage of the occupant's body position and the pressure of his body against the back of the seat which will occur whenever a rear end collision occurs, to thereby assist in holding the extended portion of the head rest, and to provide for the action of simple compression and tension forces upon the primary structural members of the head rest when it is restraining the occupant's head as during such a collision.

Another object of the invention is to provide an improved safety head rest adapted to upstand from the back of an automobile seat behind the normal position of the occupant and out of the occupant's way when he is sitting upright as in a driving position, and which may also serve as a head rest as when a passenger desires to lean back in a relaxing and reclining position.

Yet other objects of the invention are to provide an improved safety head rest for an automobile seat which is a simple, neat-appearing, low-cost, rugged and durable unit.

With the foregoing and other objects in view, all of which more fully hereinafter appear, my invention comprises certain constructions, combinations, and arrangements of parts and elements as hereinafter described, defined in the appended claims and illustrated, in preferred embodiment, in the accompanying drawing, in which:

FIGURE 4 is an enlarged, fragmentary view of a portion of the frame structure, as taken substantially from the indicated line 4—4 at FIG. 2, but with portions being in section to show constructions otherwise hidden from view.

FIGURE 5 is an enlarged, fragmentary view of a portion of the frame structure as taken substantially from the indicated line 5—5 at FIG. 2, but with portions being in section to show constructions otherwise hidden from view.

FIGURE 6 is an isometric view of a fragmentary portion of the head rest illustrated at FIG. 2, as at the region indicated by the arrow 6 at FIG. 2, but on a greatly enlarged scale.

FIGURE 7 is a diagrammatic, side elevational view of an automobile seat having the improved safety head rest mounted thereon, with an occupant outlined in full lines as sitting upon the seat in a normal upright position and in broken lines as in the position he will be pressed to by the reaction movement of sudden acceleration as from a rear end collision to the automobile and illustrating especially, the manner in which the safety head rest protects his head from injury.

FIGURE 8 is a diagrammatic sketch, following the outline of FIG. 7 and illustrating, by vector arrows, the pattern of reactive forces which occur on the seat and safety head rest during a rear end collision when the occupant is thrown rearwardly against the seat and head rest as in the manner indicated at FIG. 7.

Figure 1:
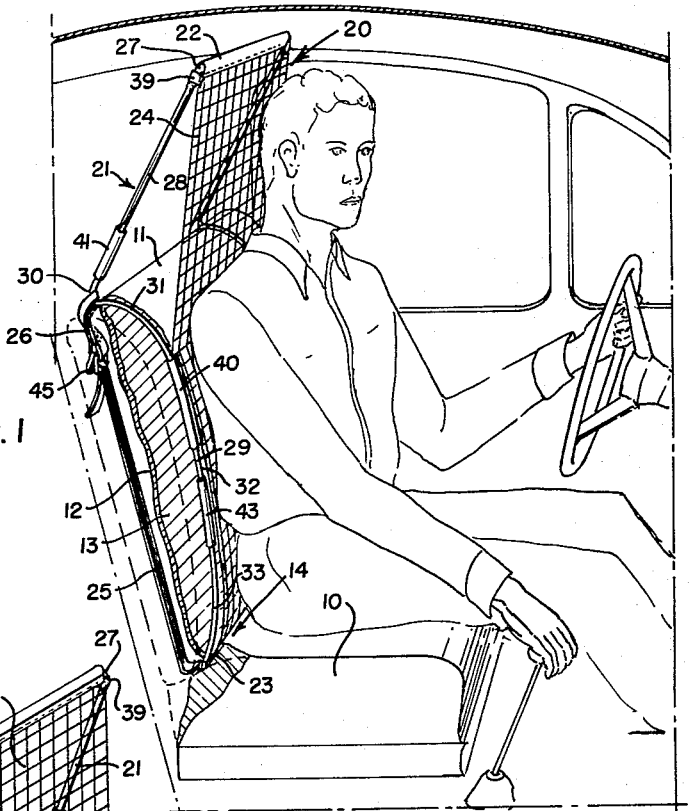
FIGURE 1 is a perspective view, somewhat diagrammatic in nature, of a portion of the interior of an automobile illustrating the drivers seat, a driver occupant thereon, and my improved safety head rest mounted upon the seat, the view illustrating further, edge portions of the seat as being broken away to illustrate constructions otherwise hidden from view.

Referring more particularly to the drawing, and to FIG. 1 thereof, the typical automobile seat includes a seating pad 10 and a back 11 which upstands from the rear edge of the pad 10 at a slight rearward inclination sufficient to afford an occupant thereof a maximum degree of comfort when sitting in an upright position. The seat back 11 is ordinarily formed as a rigid frame sheet 12 which supports a front padding 13. Although this back 11 extends downwardly to contact the pad 10, at a rear edge trough 14, the pad 10 and back 11 are usually formed as separate members, and the materials forming the pad and back at the contact at trough 14, are usually resilient so they may be spread apart slightly. It follows that straps and the like may be passed therebetween at this trough 14 as from the front to the rear side of the seat.

Although the seat back 11 is usually built as an individual member, it is mounted in the seat in a comparatively rugged manner as by brackets, not shown, and the ordinary automobile seat will resist a substantial rearward body pressure as when a rear end collision occurs and the automobile is thrust forwardly. A severe rear end collision will, however, cause the seat back to collapse rearwardly.

Nevertheless, investigations have verified the fact that the automobile seat itself is ideally suited for supporting and holding my improved safety head rest 20, and there is no need for and there should be no supplemental fastenings to other parts of the body of the automobile. Moreover, it was further ascertained that if a seat back 11 holding the head rest 20 were to collapse, as in severe rear end collision, the head rest will have served its purpose by holding the ocupant's neck straight. Moreover, by not being fastened to other points or portions of the automobile, the head rest will move with the seat and the body of the occupant therein without the possibility that the head of the occupant will be trapped and held back. The occupant of the seat may be dropped to a nearly horizontal position if the seat collapses, but this will ordinarily be the safest possible position that he can assume to avoid injury from further complications of the accident, which usually occur.

The improved safety rest 20 is formed about a rigid frame which appears as a rectangle when viewed from the front and as a curved and inclined member when viewed from the side. As such, this framework includes a pair of identically-formed upright side bars 21 which are spaced apart and are interconnected by a transversely disposed top bar 22 and a transversely disposed base bar 23. A net 24 is stretched in this rectangular opening between the top and base bars and connective straps 25 and buckle-carrying loops 26 are attached to this framework to complete the assembly, all as hereinafter described in detail.

The upright bars 21 and top bar 22 are preferably formed of small diameter steel rods, or of like material, which is comparatively strong and rugged but is also bendable to any selected form. The uprights 21 may be a single member and will now be described as such or they may consist of several sections joined together for purposes of size adjustment as will be later described. Also, in preferred construction, the uprights and the top bar are formed and bent of a single extended rod with each upright being bent downwardly from the top bar 22 as at the top corners 27.

Each upright side bar 21 is formed to define two reaches with an upper reach, above the seat, being formed by a straight, net-holding section 28 and the lower reach being formed as a curved and arched, seat-supported section 29. When the frame is properly mounted upon a seat back, the upper net-holding section 28 is disposed above the seat, with its top being near the top of the automobile and at a position above the forward wall of the seat back 11. Thence, it slopes downwardly and rearwardly at an angle of about 20 degrees from the vertical to terminate at the rear edge of the top of the seat back.

At this point, the seat supported section 29 commences and a sharp turn 30 directs the upright side bar 21 forwardly and to a downward arc 31 to fit on the forward face of the seat back pad 13 and form the upper portion of the seat-supported section 29. It is contemplated that this arc 31 may be changed by bending the bars 21 to a shape to fit any selected style of seat back. The lower portion of the seat-supported section includes a straight reach 32 below the arc 31 and an inturned bottom section 33 where the uprights connect with the base bar 23. This inturned bottom section is adapted to fit into the seat trough 14 as will be described.

The base bar 23 is adapted to hold the transverse bottom edge of the net 24 and when means are provided for changing the length of the side bars 21, as hereinafter described, the base bar is also adapted to adjust the tension on the net and for taking up net slack. Therefore, in preferred form, the base bar 23 comprises a pair of half-round rod members 34 which grip the bottom of the net 24, the half-round members 34 being held together by lock screws 35 such as illustrated at FIG. 6.

The lower end of each side bar 21 is connected to an end of this base bar 23 and a simple mode of connection is to provide a hole 36 at each end of the base bar 23 having a diameter slightly less than the diameter of the side bar rod 21. The bottom end of each bar 21 is formed with a short reach of reduced diameter which fits into a hole 36 of the base bar 23. The shoulder 37, where the reduced diameter end portion of the rod terminates, abuts against the bar 23 to limit the extent of its insertion into the hole 36 as in the manner clearly illustrated at FIG. 5. This construction provides for a very simple mode of adjusting the length and tension of the net 24. The bar 23 is removed from the ends of the side bars 21 and then rotated a desired number of half-turns for net take-up and is then again affixed to the ends of the upright bars 21.

The preferred material for this safety head rest is the net 24 as illustrated. It is to be recognized however, that other materials may also be used, for any pliable sheet material of suitable strength could serve the purpose of catching an occupant's head. Actually, in the selection of a suitable material for this purpose several factors must be considered. First, the material, or that portion of the material against which the occupant leans, must be comfortable. Secondly, the material, or that portion of the material which is above the seat, must be transparent and must not impede the vision of the occupant and especially the vision of the driver. This latter consideration restricts the selection of material to a clear synthetic resin of a tough, pliable, transparent type such as polyvinyl chloride sheets or to netting. As a further consideration, the netting is preferable to a resin sheet because it does not interfere with air circulation within the vehicle body.

The net 24, is preferably formed as a woven, reticulated fabric of nylon or similar high-strength material with the mesh openings being preferably three-quarter-inch to a one-inch size. A soft, flat-woven netting material having no knots at the node or cross-over points is commercially available and is ideal for the purpose at hand. An occupant may lean against such netting without any discomfort. Moreover, if desired, this soft-woven fabric can be stiffened with conventional sizing or, preferably, by impregnating it with uncured neoprene or the like, which, when cured as by heating, will stiffen the net sufficiently so that it will retain its desired form.

When a knotted netting is used, it is preferable to use a different type of material at the lower portion of the reach where the occupant leans against the seat and to use the netting only at the upper portion of the safety head rest which is above the automobile seat back. This lower portion may consist of any type of cloth material whereto the upper net portion is sewn. Such a construction is not shown in the drawing because it is plainly within the skill of any artisan and merely a matter of simple substitution.

The net 24 may be attached to the top bar 22 in any suitable manner. Each loop of the net may be woven into the top bar 22 or the edge of the net may be sewn or stitched to a sleeve or piping 38 which extends across the top bar 22 as illustrated. If adjustment means are not used to change the length of the side bars 21, the net may be fastened permanently to the base bar 23 in precisely the same manner; however, if adjusting means are used, it may be fastened between the half-round members 34 as hereinbefore described.

Figure 2:
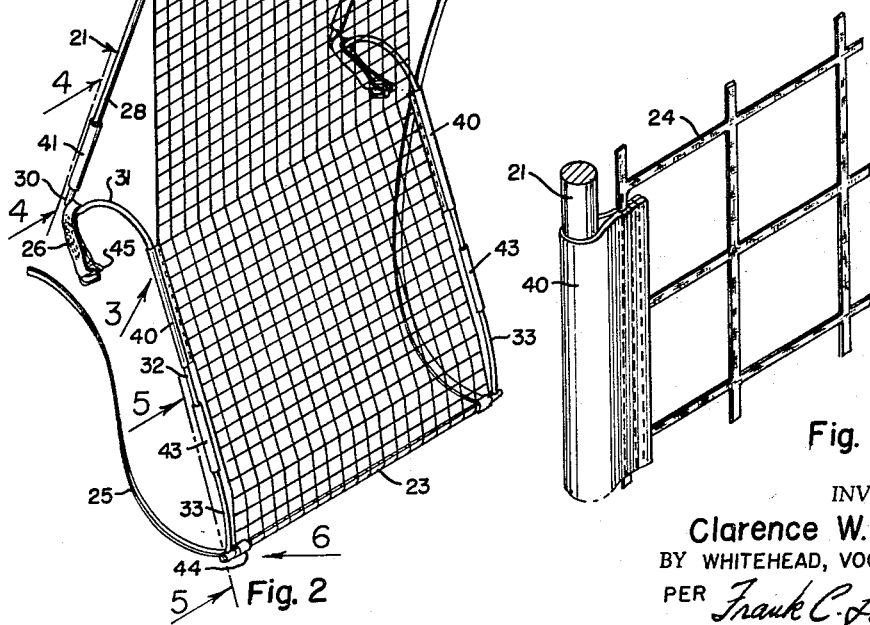
FIGURE 2 is a frontal isometric view of the head rest per se.
Figure 3:
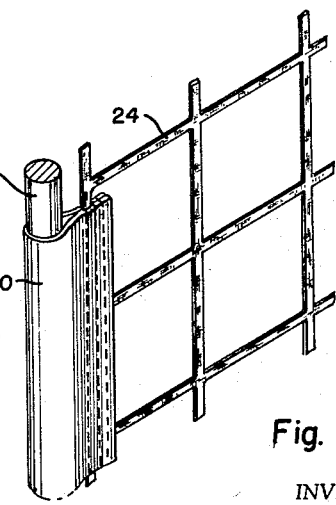
FIGURE 3 is an isometric view of a fragmentary portion of the head rest illustrated at FIG. 2, as at the region indicated by the arrow 3 at FIG. 2 but on a greatly enlarged scale.

It is to be noted that the net 24 is primarily fastened to the top bar 22 and to the base bar 23 and that it is not necessary to fasten it to the upright side bars 21. However, it is essential that the net be always spread apart on the bars 22 and 23, and it is important that movements of the occupant do not bunch the net together, especially on the top bar 22. To prevent this, small side loops 39 are provided at each top corner 27 to lock the sides of the net in place, as illustrated at FIG. 2. Also, it may be desirable to hold the middle portion of the suspended net in a spread-apart position and this can be effectively accomplished by securing a portion of each side of the net to the side bars 21. A short reach of piping 40 to which a side of the net may be sewn may be provided for this purpose at the upper portion of the seat-supported section 29 of each side bar 21 as illustrated.

It is desirable that the safety head rest 20 extend above the top of the seat back to within an inch or two of the top of the automobile where it is installed and that it extend downwardly therefrom along the front side of the seat back and into the trough 14 to a position where the base bar 23 is completely out of the way of the occupant of the seat. It follows that adjustments are desirable on a commercial universal style head rest 20 to allow for variations of a few inches in the clearance height above the seat back and in the height of the seat back of any of the several different common types of automobiles. To provide for such adjustments, a simple extension-contraction means may be provided at the upper and lower reaches of the side bars 21.

Each straight net-holding section 28 may be separated as into two members with the lower member having a tube 41 welded thereto and with the upper member snugly fitting into the tube. In addition, the tube may hold one or more spacer dowels 42 as in the manner clearly illustrated at FIG. 4. By providing, as a commercial unit, a net-holding section 28 of a maximum height and with a maximum number of spacer dowels 42, it is a simple matter of reducing this height to any desired height by removing the proper number of spacer dowels and then rolling up the net slack on the base rod 23 as hereinbefore described.

The straight reach 32 of each seat-supported section 29 may also be departed as into two members with the lower member having a tube 43 welded thereto and with the upper member snugly fitting into the tube. In addition, this tube 43 may also hold one or more spacer dowels 42 as in the manner clearly illustrated at FIG. 5. By providing, as a commercial unit, a seat supported section 29 of maximum height and with a maximum number of spacer dowels 42, it is a simple matter of reducing this height to any desired height by removing the proper number of spacer dowels and then rolling up the net slack on the base rod 23 as hereinbefore described.

After the height of the reaches of the safety head rest 20 are properly adjusted for a given automobile and the arc of portion 31 is bent and shaped to properly fit the automobile seat, the unit is ready for installation in the automobile. This involves simply placing the unit in position on the seat and securing it thereto by straps extending about the back 11 of the seat. A connective strap 25 is fastened to each end of the base bar 23 as by a sewn connective loop 44. Each strap is adapted to be passed between the seat pad 10 and the back 11 at the trough portion 14 and to the rear of the seat. Thence, each strap extends up the back side of the seat back 11 for connection with a buckle 45 on a buckle-carrying loop 26. Each buckle-carrying loop, which is a short, sewn strap loop with one end being positioned about a side bar at the turn 30, and with the other end holding the buckle 45.

An occupant of a seat wherein the safety head rest is installed, when sitting in an upright position leans against the lower portion of the net and against the back of the seat. The net extends upwardly from the point where his shoulders and body naturally lean forwardly from the seat back, as clearly illustrated at FIG. 7. With the net extending upwardly from this point, it is completely out of the way of the occupant and will not interfere with his normal body and head movements, even when the occupant is wearing a hat. A passenger occupant of the automobile may however, lean his head and body backwards and to a comfortable reclining position with the net 24 holding his head.

The real value of the safety head rest appears whenever the automobile is struck as in a rear end collision and is suddenly thrown forwardly. The acceleration resulting from such a collision pulls the occupant rearwardly with his body being pushed into the pad 13 of the seat back and with his head being caught in the net 24 as in the manner indicated in broken lines at FIG. 7. Although this force of the body of the occupant against the seat and of his head against the net may be considerable, the whip-lash effect is completely eliminated and the occupant may quickly recover his position to apply brakes if he is the driver or to shield himself against a subsequent forward reactive movement after the car stops.

The critical force pattern on the safety head rest is indicated at FIG. 8. The force of the occupant's head creates an up and down tension 24' on the net 24 at the point where his head deflects the net. The tension pull of the net reacts on the top bar 22 and the reaction is transferred to those portions of the side bars 21 which form the net holding section 28. The side bars at this section 28 are leaning rearwardly and are compressed against the top of the seat back, as indicated by 28' in resisting the downward and rearward components of thrust created by the downpull of the net 24.

The portion of the net 24 below the point where the occupant's head contacts, the net is pulled upwardly. This upward pull is resisted by the mass of the occupant's body pressing the lower portion of the net against the seat back. This pressure of the occupant's body creates a friction force tending to hold the lower portion of the net in place against the back of the seat, which is substantially in excess of the pull effect 24' of the occupant's head with the result, that the lower portion of the net is effectively held in place.

As a supplementary securing means, the straps 25 passing about the rear side of the seat back 11, when tightened effectively act further to hold the lower portion of the net, which is connected to the base bar 23.

Tests show that the size of the side, top, and base rods may be surprisingly small to safely hold an occupant's head. A quarter-inch or three-eights-inch diameter steel rod is fully adequate to protect the occupant's head in any collison which is not severe enough to collapse the back of the seat. Further, where a rear end collision is so severe that the automobile seat is collapsed, the falling-back of the occupant when the seat collapses is usually a desirable result.

I have now described my invention in considerable detail, but it is obvious that others skilled in the art can devise and build alternate and equivalent constructions which are within the spirit and scope of my invention, hence, I desire that my protection be limited, not by the constructions illustrated and described, but only by the proper scope of the appended claims.

I claim:

1. A safety head rest for an automobile seat adapted to extend above the back of the automobile seat to catch the head of an occupant in event of a rear-end collision or the like, and comprising:

(a) a generally rectangular frame adapted to be mounted upright upon a seat back of the automobile and including a pair of spaced-apart side bars, with each side bar having an upper portion adapted to upstand from the top of the seat near the rearward edge thereof and to extend upwardly and forwardly therefrom with the top of each upper portion being substantially over the forward edge of the seat back, and with each side bar having a lower seat-supported portion shaped substantially to the form of the seat back and being turned from the alignment of the said upper portion to lie upon top of the seat back and turned thence, to curve downwardly, to lie against the forward side of the seat back, and to extend downwardly and substantially to the seat trough, a transverse top bar extending between the top of the side bars with the forwardly inclined side bars holding this top bar a short distance forwardly of the top of the seat back and a transverse base bar extending between the bottom of the side bars;

(b) a pliable sheet stretched between the top and bottom transverse bars with at least the upper portion thereof, which normally extends above the seat back, being substantially transparent; and, (c) connective straps extending from the top of the seat-supported portion of each side bar and from the bottom of the frame adapted to be wrapped about the back side of the seat back to secure the frame in position upon the seat.

2. In the safety head rest combination defined in claim 1, wherein the forward inclination of the upper portions of said side bar positions the top bar forwardly of the top of the seat back and a short distance behind the normal head position of an occupant in the seat, thereby to permit said sheet to extend downwardly therefrom to contact with the front side of the seat back at a point below the top edge of the seat back.

3. In the head rest defined in claim 1, wherein at least the upper portion of the sheet which extends above the seat back is a net.

4. In the head rest defined in claim 1, wherein said sheet is formed of netting.

5. In the safety head rest combination defined in claim 1, wherein the lower portion of each side bar turns downwardly and inwardly to extend into the trough of the seat to thereby be positioned and to hold said base bar in the seat trough below and out of contact with an occupant of the seat.

6. In the safety head rest combination defined in claim 1, wherein said frame base bar is formed with an orifice in each end wherethrough the lower ends of the side bars project to removably interconnect the base bar with the side bars and said sheet is affixed to the base bar and adapted to be wrapped about the base bar for take-up of slack, with the take-up operation being effected by removal of the base bar from the side bars to permit rotation thereof for wrapping of the sheet thereon and then replacement of the base bar onto the lower ends of the side bars.

7. In the safety head rest combination defined in claim 1, mean adapted to take up slack in the sheet and means in each side bar adapted to vary the length of the side bar whereby to permit fitting adjustments to the frame and subsequent tightening adjustments to the sheet.

8. In the safety head rest combination defined in claim 1, wherein the upper portion of each side bar includes a telescopically adjustable section with spacer means therein adapted to adjust the height of each side bar portion above the seat back.

9. In the safety head rest combination defined in claim 1, wherein the lower portion of each side bar includes a telescopically adjustable section with spacer means therein adapted to adjust the length of the lower seat-supported section to fit the back of a selected automobile seat.

10. In the safety head rest combination defined in claim 1 a telescopic adjusting section in each side bar adapted to vary the length of the side bar, including a tubular section at one portion of the side bar and a straight section at the other portion of the side bar which telescopically fits into the tubular section and spacer dowels adapted to be placed into and removed from the tubular section to selectively adjust depth of insertion of the straight section into the tubular section.

11. In the organization set forth in claim 10, wherein said sheet is affixed to said lower seat-supported portions of the side bars to provide lateral restraint of the sheet at the portion where against an occupant leans.

References Cited in the file of this patent

UNITED STATES PATENTS

| | | |
|---|---|---|
| 604,212 | Palmer | May 17, 1898 |
| 2,260,352 | Trapani | Oct. 28, 1941 |
| 2,474,597 | Warzowsky | June 28, 1949 |
| 2,564,915 | Nelson | Aug. 21, 1951 |
| 2,756,808 | Eichorst | July 31, 1956 |
| 3,084,978 | Johansson | Apr. 9, 1963 |